(12) United States Patent
Ottnad et al.

(10) Patent No.: US 12,157,196 B2
(45) Date of Patent: Dec. 3, 2024

(54) METHOD FOR LOADING A PANEL DEPOSITING DEVICE OF A FLATBED MACHINE TOOL AND FLATBED MACHINE TOOL

(71) Applicant: TRUMPF Werkzeugmaschinen SE + Co. KG, Ditzingen (DE)

(72) Inventors: Jens Ottnad, Karlsruhe (DE); Willi Poenitz, Leonberg (DE); Magnus Deiss, Stuttgart (DE)

(73) Assignee: TRUMPF WERKZEUGMASCHINEN SE + CO. KG, Ditzingen (DE)

( * ) Notice: Subject to any disclaimer, the term of this patent is extended or adjusted under 35 U.S.C. 154(b) by 389 days.

(21) Appl. No.: 17/706,711

(22) Filed: Mar. 29, 2022

(65) Prior Publication Data

US 2022/0219277 A1 Jul. 14, 2022

Related U.S. Application Data

(63) Continuation of application No. PCT/EP2020/076955, filed on Sep. 25, 2020.

(30) Foreign Application Priority Data

Sep. 30, 2019 (DE) ..................... 10 2019 126 403.0

(51) Int. Cl.
*B23Q 17/24* (2006.01)
*B23K 37/04* (2006.01)
(Continued)

(52) U.S. Cl.
CPC ...... *B23Q 17/2428* (2013.01); *B23K 37/0461* (2013.01); *G05B 19/401* (2013.01);
(Continued)

(58) Field of Classification Search
CPC ................ G05B 19/401; G05B 19/402; G05B 2219/37555; G05B 2219/31077;
(Continued)

(56) References Cited

U.S. PATENT DOCUMENTS

| 5,396,279 A | 3/1995 | Vossen |
| 5,570,190 A | 10/1996 | Terawaki et al. |

(Continued)

FOREIGN PATENT DOCUMENTS

| CN | 101990481 A | 3/2011 |
| CN | 105643092 A | 6/2016 |

(Continued)

*Primary Examiner* — Nicholas Klicos
(74) *Attorney, Agent, or Firm* — LEYDIG VOIT & MAYER LTD.

(57) ABSTRACT

Disclosed is a method for loading a sheet placement device of a flat bed machine tool with a material sheet, wherein the material sheet is supplied to the machining operation carried out by the flat bed machine tool, starting from a target position assigned to the machining operation in a machine coordinate system, and the flat bed machine tool comprises a camera system having at least one camera. The camera system is designed to produce captured images of the sheet placement device, which are calibrated three-dimensionally in relation to the machine coordinate system of the flat bed machine tool. The method comprises the steps: producing a captured image of the material sheet in the region of the sheet placement device; evaluating the captured image to determine an actual sheet position in the machine coordinate system; measuring a deviation of the determined actual sheet position from the target position; and using the measured deviation to align and position the material sheet.

16 Claims, 4 Drawing Sheets

(51) Int. Cl.
*G05B 19/401* (2006.01)
*G05B 19/402* (2006.01)

(52) U.S. Cl.
CPC ...... *G05B 19/402* (2013.01); *B23Q 2240/002* (2013.01); *G05B 2219/37555* (2013.01)

(58) Field of Classification Search
CPC ........... G05B 2219/35162; G05B 2219/36199; G05B 2219/37002; G05B 2219/37582; G05B 2219/45041; G05B 2219/45234; G05B 2219/50151
See application file for complete search history.

(56) References Cited

U.S. PATENT DOCUMENTS

| | | | |
|---|---|---|---|
| 5,806,390 A * | 9/1998 | Pomerleau | B26D 5/005 |
| | | | 700/130 |
| 11,009,856 B2 | 5/2021 | Kiefer et al. | |
| 2003/0114952 A1* | 6/2003 | Scott | G05B 19/4097 |
| | | | 700/171 |
| 2008/0101687 A1 | 5/2008 | Goeller | |
| 2009/0250445 A1 | 10/2009 | Yamaguchi et al. | |
| 2009/0321397 A1 | 12/2009 | Krishnaswami et al. | |
| 2011/0316977 A1 | 12/2011 | Pienaar | |
| 2013/0270239 A1* | 10/2013 | Wu | B23K 26/0846 |
| | | | 219/121.72 |
| 2014/0160273 A1* | 6/2014 | Jedynak | H04N 7/18 |
| | | | 348/95 |
| 2015/0254604 A1* | 9/2015 | Arora | G06Q 10/0832 |
| | | | 705/332 |
| 2017/0115656 A1 | 4/2017 | Ottnad et al. | |
| 2017/0255183 A1* | 9/2017 | Clement | B25J 9/1697 |
| 2018/0079041 A1 | 3/2018 | Schmauder | |
| 2018/0113434 A1* | 4/2018 | Shapiro | B23K 26/0876 |
| 2018/0126507 A1* | 5/2018 | Rivers | B23Q 17/2428 |
| 2018/0239331 A1* | 8/2018 | Forrest | G05B 19/182 |
| 2019/0076896 A1* | 3/2019 | Goto | B21B 1/26 |
| 2019/0143391 A1* | 5/2019 | Walti | B21D 43/24 |
| | | | 414/783 |
| 2019/0243343 A1 | 8/2019 | Kiefer et al. | |
| 2019/0278250 A1* | 9/2019 | Clement | B25J 9/1697 |
| 2020/0068909 A1* | 3/2020 | Blaine | G05B 19/4166 |
| 2020/0208989 A1 | 7/2020 | Ottnad et al. | |
| 2020/0239249 A1* | 7/2020 | Wade | B65H 3/0816 |
| 2021/0138589 A1 | 5/2021 | Bader | |
| 2021/0229308 A1 | 7/2021 | Ottnad et al. | |
| 2021/0308787 A1 | 10/2021 | Kiefer et al. | |

FOREIGN PATENT DOCUMENTS

| | | |
|---|---|---|
| DE | 10323438 B3 | 11/2004 |
| DE | 102007018416 A1 | 5/2008 |
| DE | 202009005329 U1 | 7/2009 |
| DE | 102009012543 A1 | 9/2010 |
| DE | 102009056013 A1 | 3/2011 |
| DE | 102012104706 A1 | 10/2013 |
| DE | 102013204409 A1 | 9/2014 |
| DE | 102014213518 A1 | 1/2016 |
| DE | 102016117681 A1 | 3/2018 |
| DE | 102016120131 A1 | 4/2018 |
| DE | 102017120382 B3 | 10/2018 |
| DE | 102017223574 A1 | 6/2019 |
| DE | 102018126077 A1 | 4/2020 |
| DE | 102018133524 A1 | 6/2020 |
| DE | 1020181335240 A1 | 6/2020 |
| EP | 0546364 A1 | 6/1993 |
| EP | 1222975 A2 | 7/2002 |
| EP | 1342527 A1 | 9/2003 |
| EP | 2590040 A1 | 5/2013 |
| EP | 2590040 B1 | 5/2014 |
| JP | H11320143 A | 11/1999 |
| JP | 2013039591 A | 2/2013 |
| TW | 201021956 A | 6/2010 |
| WO | WO 2016005159 A2 | 1/2016 |
| WO | WO 2017190258 A1 | 11/2017 |
| WO | WO 2018224697 A1 | 12/2018 |

* cited by examiner

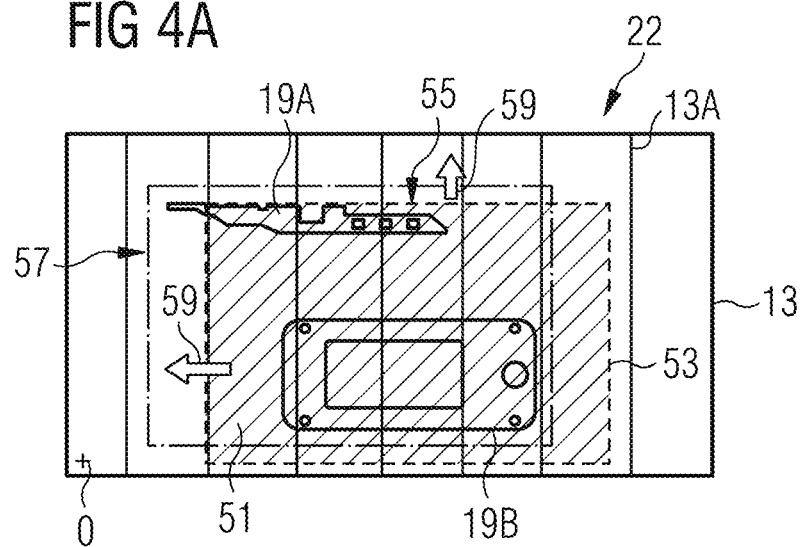
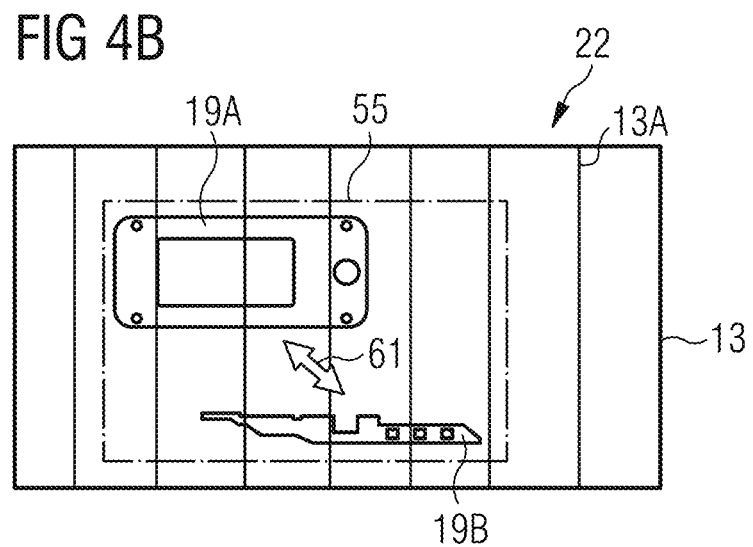

METHOD FOR LOADING A PANEL DEPOSITING DEVICE OF A FLATBED MACHINE TOOL AND FLATBED MACHINE TOOL

CROSS REFERENCE TO RELATED APPLICATIONS

This application is a continuation of International Application No. PCT/EP2020/076955 (WO 2021/063837 A1), filed on Sep. 25, 2020, and claims benefit to German Patent Application No. DE 10 2019 126 403.09, filed on Sep. 30, 2019. The aforementioned applications are hereby incorporated by reference herein.

FIELD

Embodiments of present invention relate to a method for loading a panel depositing device of a flatbed machine tool with a material panel. Embodiments of the present invention also relate to a flatbed machine tool.

BACKGROUND

Flatbed machine tools such as laser cutting machines are used for machining material panels such as sheet-metal blanks/metal sheets. For this purpose, a material panel to be machined is usually deposited on a pallet and with this is introduced into a machining space of the flatbed machine tool. Usually, the loading takes place manually, i.e. without any aids, in the case of small material panels or with the aid of a lifting device in the case of larger formats of material panels. In both cases, stops may be provided on the pallet, in order to ensure the loading of the pallet in a fixed position.

An example of a lifting device for plate-like metal workpieces is known from DE 10 2017 223 574 A1, in particular for use with a flatbed machine tool.

The information relevant for loading, such as the type of material panel (given for example by the panel dimensions and type of material) and panel alignment, has to be obtained by the operator from the order papers and production documents. The machining operation is dependent on correct loading with workpieces to be cut out. This presupposes in particular correct alignment of the material panels at the stops, at least within predetermined tolerances.

It is alternatively known from JP 2013-039591 A to use a camera in a cutting region in order to detect a material to be cut with the aid of base points, the base points being provided in the cutting region and thus being able to be detected in a recorded image of the camera.

SUMMARY

Embodiments of the present invention provide a method for loading a panel depositing device of a flatbed machine tool. The method includes acquiring, using a camera system, an image recording of a material panel in the area of the panel depositing device. The camera system is spatially calibrated in relation to a system of machine coordinates of the flatbed machine tool. The method further includes evaluating the image recording for determining an actual panel position of the material panel in the system of machine coordinates, detecting a deviation of the actual panel position from a target panel position, and using the detected deviation for aligning and positioning of the material panel.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIGS. 4A and 4B show schematic representations of image recordings, given by way of example, which can be displayed to an operator to assist the loading operation and machining planning.

DETAILED DESCRIPTION

Figure 1:
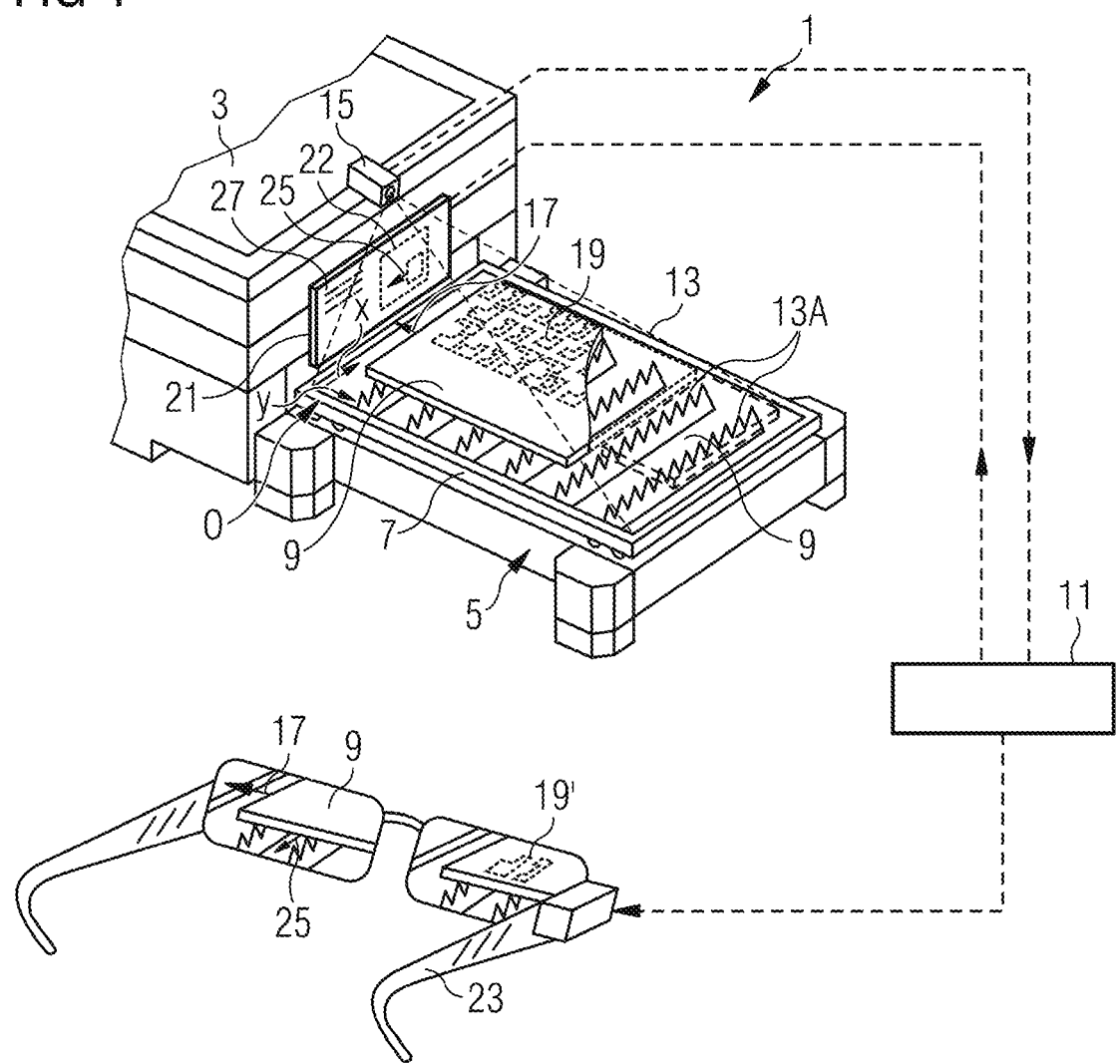
FIG. 1 shows a schematic spatial representation of a flatbed machine tool with a pallet, which is ready to be moved into the flatbed machine and has been loaded with a material panel.

One aspect of this disclosure can make a loading operation of flatbed machine tools easier and can make flexible inclusion of the loading operation in the production process possible. It is possible to optimize the use of a lifting device in the loading operation, in order to assist an operator of a flatbed machine tool during loading and also during the individual separation of machined parts.

One aspect of the disclosure concerns a method for loading a panel depositing device of a flatbed machine tool with a material panel, wherein the material panel is to be fed to the machining with the flatbed machine tool from a target position assigned to the machining in a system of machine coordinates and the flatbed machine tool comprises a camera system with at least one camera. The camera system is designed for producing image recordings of the panel depositing device which are spatially calibrated in relation to the system of machine coordinates of the flatbed machine tool. The method may comprise the following steps:

producing an image recording of the material panel in the area of the panel depositing device, evaluating the image recording for determining an actual panel position in the system of machine coordinates, detecting a deviation of the determined actual panel position from the target position and using the detected deviation for the alignment and positioning of the material panel.

In a further aspect, a flatbed machine tool, optionally a laser-cutting flatbed machine for cutting out workpieces from a material panel with a laser beam, comprises:

a panel depositing device, optionally designed as a pallet changer with a pallet or as a machine table, for providing a depositing surface for bearing the material panel, a camera system with at least one camera, which is designed for producing an image recording of the panel depositing device which is spatially calibrated with respect to the system of machine coordinates of the flatbed machine tool, wherein the image recording optionally shows a pallet with the material panel resting on it or at a vertical distance, a machining unit, which is optionally designed as a laser cutting unit, and a control unit for carrying out a method such as is described above and generally herein. The flatbed machine tool may optionally also have a lifting device.

The at least one camera may be attached to the machining unit. The camera system may also be designed for two-dimensional and/or three-dimensional image capture.

In some developments, the actual panel position may be determined in a supporting plane of the panel depositing device. In this case, the actual panel position and the target position may be respectively given by a distance in the supporting plane between a reference point of the material panel and a reference point of the supporting plane and also by an alignment of the material panel in the supporting plane.

In some developments, the method comprises the step of:
depositing the material panel on the panel depositing device, so that the actual panel position for a deposited material panel is determined.

In some developments, a lifting device for depositing the material panel on the panel depositing device is also used and the method also comprises the steps of:
picking up the material panel with the lifting device and transporting the material panel with the lifting device over the panel depositing device, so that the actual panel position for a material panel held above the panel depositing device is determined.

In this case, the actual panel position in the supporting plane of the panel depositing device may be determined on the assumption of a purely lowering movement of the material panel onto the panel depositing device. In addition or as an alternative, an equation for transformation of a spatially determined position of the material panel into the system of machine coordinates may be obtained with the aid of at least one marker or at least one key feature which is provided on the lifting device, in order to determine the actual panel position in the supporting plane. In addition or as an alternative, the lifting device may comprise a weighing unit for determining the mass of the material panel picked up, wherein the weighing unit may optionally be a balance or a computing unit which deduces the mass from the first image recording of the material panel and predetermined parameters of the material panel. The method may correspondingly also comprise the following steps:
determining the mass of the material panel picked up, comparing the determined mass with a predetermined mass of the material panel intended for machining and outputting an error signal in the case where the comparison finds a difference between the determined mass and the predetermined mass.

In some embodiments, the method may also comprise the following steps:
deducing geometrical dimensions of the material panel from the image recording by using the spatial calibration of the camera and
determining the actual panel position on the basis of the geometrical dimensions of the material panel.

In some embodiments of the method, the detected deviation may be used to activate the lifting device in such a way that the material panel is deposited at the target position, wherein optionally automated depositing takes place. In addition or as an alternative, the detected deviation may be used to display information about the deviation and optionally the target position and/or the actual panel position to an operator of the flatbed machine tool. This may for example take place on a monitor of the flatbed machine tool or be introduced into an augmented reality display unit. Optionally, further items of process information may be displayed. In addition or as an alternative, the detected deviation may be used to adapt the machining process and optionally the target position in dependence on the actual panel position and optionally an arrangement of supporting bars of the panel depositing device, in particular captured by the camera.

In some embodiments of the method, the target position may:
be predeterminable manually by an operator of the flatbed machine tool, and/or
be calculated in dependence on a detected arrangement of supporting bars of the panel depositing device, which is optionally captured by the camera system, at the time of depositing the material panel, and/or
be ascertained in dependence on a nesting of workpieces to be produced from the material panel and optionally in dependence on at least one of the parameters avoidance of tilting workpieces, supporting of the workpieces during the cutting process and avoidance of slag spatter on workpieces and welding of workpieces.

The concepts described herein concern in particular the machining of metal sheets (sheet-metal panels, plate-like metal starting workpieces) with a (laser-cutting) flatbed machine tool.

Advantages of the embodiments of the present invention include positionally accurate and largely error-reduced loading of a panel depositing device of a flatbed machine tool with one or more sheet-metal panels and also facilitated transport and simplified positioning of heavy individual parts.

Embodiments of the present invention may also increase the reliability of the process, in that for example allowance is made in the machining for a situation with respect to supporting bars. Procedures, given by way of example, which make allowance for this when creating laser cutting plans are disclosed in the applicant's not yet published German patent application DE 10 2018 126 077.6 with the filing date of Oct. 19, 2018.

What is more, an advantageous increase in productivity may be obtained as a result of shortened material changing times.

Aspects described herein are based partly on the realization that the loading operation carried out manually or assisted by a lifting device can be assisted with respect to the position of a sheet-metal panel on a panel depositing device with the aid of an optical measuring system. Thus, it has been realized that optical detection of the sheet-metal panel to be machined can make it possible to position a sheet-metal panel correctly on the panel depositing device with respect to the machining to be performed, for example independently of stops. In this case, the positioning may optionally be adapted to the machining process. What is more, an evaluation of the position of the optically detected sheet-metal panel may be included in the machining process of the material panel itself, thus for example
when creating a machining plan,
when checking the material and geometry of the deposited material panel/the material panel to be deposited, and consequently checking with respect to correct selection of the material panel or
when checking the position of a deposited material panel/a material panel to be deposited with respect to the configuration of the panel depositing device, for example with respect to the relative position of the supporting points in relation to the cutting line.

According to embodiments of the present invention, in the case of manual loading of a sheet-metal working machine (as an example of a flatbed machine tool), the position of a sheet-metal panel (as an example of a material panel) may be detected by means of an optical measuring system and the detected current position displayed to the operator of the sheet-metal working machine. According to embodiments of the present invention, the operator may be assisted when depositing a material panel in an optimum depositing position or a depositing position intended for the machining (target position) if the depositing position is for example predetermined by the control system of the flatbed machine tool. In this case, the target position does not have to be an absolute position, but may have tolerances. For example, tolerances of up to +/−50 mm may be allowed, if for example the machining plan has made allowance for them. The control system of the flatbed machine tool, in particular the activation of the laser, may detect the actual position (if it lies for example within a range of tolerance) and adapt the machining program (for example the cutting plan) to the actual position by means of transformation. Similarly, the use of a lifting device may be optimized, in order to assist the operator optimally when loading a panel depositing device of a flatbed machine tool and optionally also during the later individual separation of machined parts.

Figure 2:
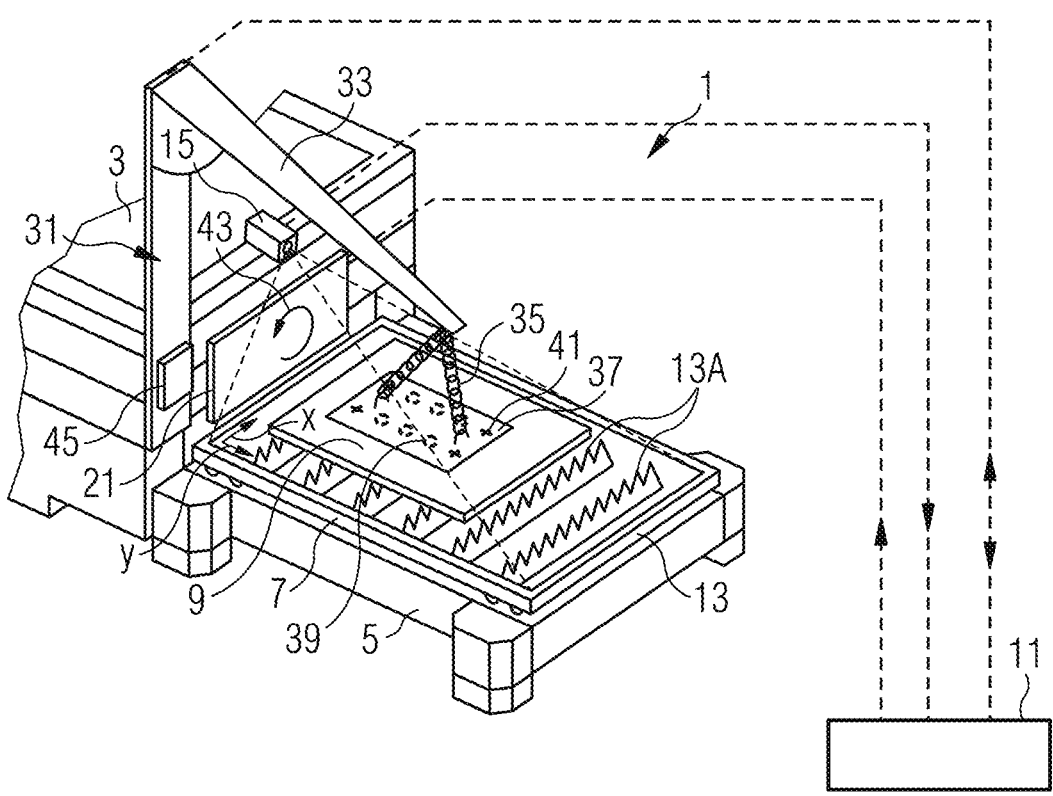
FIG. 2 shows a schematic spatial representation of a flatbed machine tool with a lifting device for loading a pallet.

FIGS. 1 and 2 show configurations, given by way of example, of flatbed machine tools 1, in which the concepts disclosed herein can be implemented. FIG. 1 relates to manual loading and additionally illustrates the aspect of information display. As a difference from this, FIG. 2 shows loading assisted by a lifting device.

In FIG. 1, the flatbed machine tool 1 comprises a machining unit 3, for example a cutting unit, which represents a machine area in which machining of a material takes place, for example a cutting operation can be carried out.

The flatbed machine tool 1 also comprises an upstream pallet changer 5, which allows operation of the flatbed machine tool 1 to be carried out with one or more pallets 7. A material panel 9 (in particular of sheet metal) for a machining operation, for example a cutting operation, has been deposited on the pallet 7. The pallet changer 5 with the pallet 7 is an example of a panel depositing device, which in this case is assigned to the flatbed machine tool 1. Generally, the panel depositing device may belong to a device for cutting plate-like workpieces, in particular metal sheets, such as a laser flatbed machine tool. The machining operation takes place in the machining unit 3 as soon as the pallet 7 with the material panel 9 is moved into the machining unit 3. The sequence of the machining operation is controlled and monitored for example by a control unit 11.

The pallet 7 comprises a, for example rectangular, pallet frame 13 with short and long side portions and also an arrangement of supporting bars 13A. The supporting bars 13A are fastened to the pallet frame 13 on the long side portions and run parallel to the short side portions of the pallet 7. The material panel 9 to be cut has been deposited on a supporting plane defined by the supporting bars 13.

FIG. 1 also schematically shows a camera 15 as an example of a camera system for the capture of two-dimensional or three-dimensional recordings. For multi-dimensional recordings, multiple cameras may also be used. The camera 15 is by way of example attached to the machining unit 3 centrally with respect to the pallet changer 5 at a distance from the supporting plane and, for recording the pallet 7, is aligned with it. Herein, a camera is generally an image recording device, which preferably operates in the visible wavelength range. The image recording may however also be based on a different wavelength range (for example infrared range) or on other radiations (ultrasound rays). For the concepts disclosed herein, for example a camera system for image capture may be used, as it is described in DE 10 2016 120 131 A1 for assisting when sorting workpieces or in the applicant's not yet published German patent application DE 10 2018 133 524.5 with the filing date of Dec. 21, 2018 with respect to the processing of residual cut-out sheets.

The camera 15 sends image data to the control unit 11 of the flatbed machine tool 1, in which an image processing algorithm can be carried out. Specifically, it is proposed herein to obtain information about the position (position and alignment) of the material panel 9 with the image processing algorithm and to use it in the machining operation and/or during preparation for it. For example, a current position of the material panel 9 on the pallet 7 can be determined with the image processing algorithm from an image recording of the pallet 7 (with the material panel 9 resting on it). The position and the alignment of the material panel 9 may be determined in relation to a reference point of the reference system of the flatbed machine tool 1. For example, the image processing algorithm may deduce an alignment (rotation) of a rectangular material panel 9 in the supporting plane and/or a translation of a reference point of the material panel 9 with respect to a reference point 0, which is assigned to a corner point of the rectangularly formed pallet 7.

For example, the camera 15 is calibrated to a system of machine coordinates of the machining unit 3. Correspondingly, for example, a transformation of image coordinates into machine coordinates (for example as an equation for transformation) may be stored in the control unit, so that image recordings, and in particular the position of the material panel 9 captured therein, can be set in relation to the system of machine coordinates. In other words, a calibration of the camera 15 makes it possible to calculate a translation and/or a rotation of the material panel 9 in relation to a reference point, or to a target position, which is given in relation to the reference point (and usually with a range of tolerance).

For a machining operation, the pallet 7 can be moved into the machining unit 3 along a pallet-introducing direction 17. The pallet changer represented allows operation of the laser flatbed machine 1 with a pallet from one side. As an alternative, a respective pallet changer may be provided on opposite sides of the machining unit 3, so that the flatbed machine tool 1 can be operated from two sides, and correspondingly two camera systems are required.

FIG. 1 indicates by way of example contours 19 of parts to be cut out from the material panel 9, as they have been established in a machining plan, here a cutting plan, with respect to a target position.

As explained in connection with FIG. 3, according to the concepts disclosed herein, the camera 15 serves for producing image recordings of the material panel 9 in the area of the panel depositing device (in FIG. 1 deposited and in FIG. 2 shortly before depositing). Subsequently, the image recordings are evaluated, in order to assist the loading operation. For example, results of the evaluation by the control unit 11 may be output on a monitor 21—connected for data exchange to the control unit 11. The monitor 21 is arranged on the machining unit 3 such that it can be seen as well as possible for example by an operator standing in the area of the pallet changer 5. FIG. 1 shows an image recording 22 of the deposited material panel 9, as it is displayed on the monitor 21.

As an alternative or in addition, the results of the image processing algorithm may be introduced as information into the field of view of (3D) data glasses 23—connected for data exchange to the control unit 11. If the wearer (not shown) of the data glasses 23 looks at the pallet 7, additional information about the positioning of the material panel 9 can be displayed to him or her.

By way of example, in FIG. 1 the data glasses 23 and the monitor 21 show a displacement arrow 25, which is set against the material panel 9 seen or recorded and indicates the direction in which the material panel 9 is to be moved in order to arrive in a target position. As already mentioned, the data glasses 23 and the monitor 21 can display additional information about the current machining operation to the operator. By way of example, in FIG. 1 contours 19' of workpieces to be cut are indicated on the data glasses 23 and order data 27 concerning a workpiece to be cut, such as for example information about the material panel (lateral dimensions and thickness and also the type of panel material), are indicated on the monitor 21.

The flatbed machine tool 1 represented in FIG. 2 comprises a lifting device 31 for transporting and depositing in particular large material panels, wherein the lifting device may also be provided independently of the flatbed machine tool 1. With respect to the configuration of the panel depositing device, the camera system, etc., reference is made to FIG. 1. The control unit 11 is for example connected for data exchange to the machining unit 3, the lifting device 31, the monitor 21 and the camera 15.

In FIG. 2, the lifting device 31 is schematically represented as a crane with a boom 33. Suspended from the boom 33, for example on a chain 35 or a rigid mounting system, is a holding device 37. The holding device 37 allows the material panel 9 to be fixed, for example by means of suckers 39. For example, an uppermost material panel is picked up by the lifting device 31 from a panel-blank pallet (not shown) and swung over the pallet 7, in order to deposit it there.

FIG. 2 shows the state shortly before depositing, in which the material panel 9 is hovering just above the target position on the pallet 7. In this (first) actual panel position, a (first) image recording is produced by the camera system 15. In this case, the detection of the spatial position and alignment of the material panel 9 may be assisted for example by markers 41 provided on the holding device 37.

Results of the image processing algorithm may again be displayed to an operator for example on the monitor 21 (in FIG. 2, an arrow 43 for illustrating a required rotation is indicated by way of example) or be introduced into the field of view of data glasses. The information may also be used for controlling the lifting device 31 in such a way that the material panel 9 is moved exactly over the target position, and can correspondingly be deposited on the pallet 7. This may take place in a partly or fully automated manner.

The lifting device 31 may also have a weighing unit for determining the weight of the suspended material panel 9. The determined weight makes it possible to check whether or not the correct material panel has been picked up. The weighing unit may for example be based on a balance 45 and/or an evaluation of the captured image recordings. In the latter case, the control unit 11 can infer the weight of the material panel 9 from the obtained dimensions of the material panel 9 together with information about the material (type of material).

Figure 3:
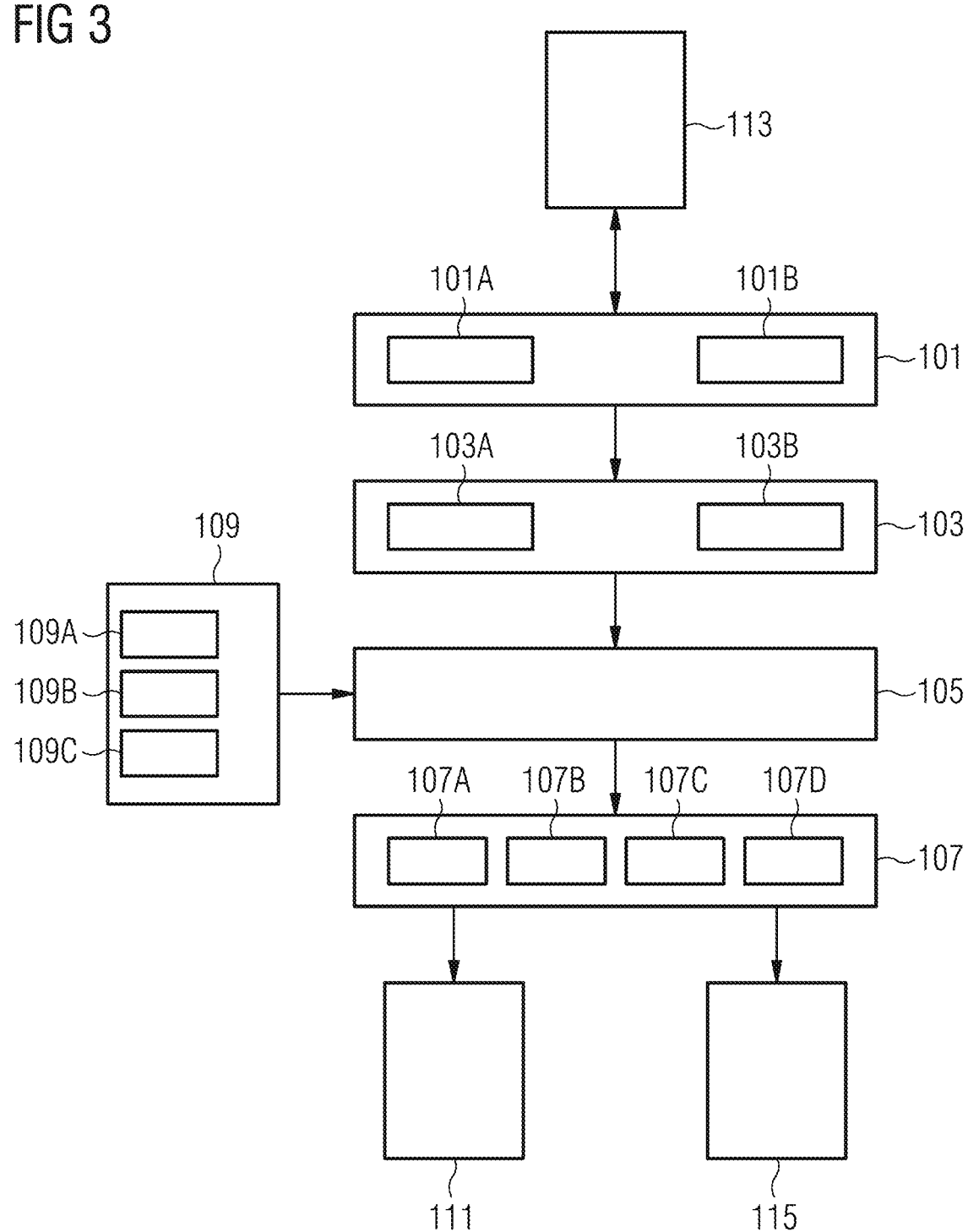
FIG. 3 shows a flow diagram for illustrating a method for loading a panel depositing device.

FIG. 3 illustrates in a flow diagram various aspects which can be included individually or in groups in a method for loading a panel depositing device of a flatbed machine tool with one or more material panels. In this case, the concepts proposed herein are of advantage, in particular in the case of multi-panel loading situations, if for example the depositing positions (target positions) cannot be predetermined by means of stops for all of the material panels.

The starting point is the provision of an optical measuring system (camera system) consisting of 2D and/or 3D cameras. The measuring system produces a first image recording of the material panel 9 (step 101), from which a first (current) actual panel position can be deduced. The production of the first image recording may take place on a supporting plane after depositing of the material panel has taken place (step 101A). As an alternative, the first image recording of the material panel 9 may be captured while the material panel 9 on the lifting device is above the supporting plane (step 101B). The supporting plane is also referred to as the working area, as it is provided for example by the panel depositing device (for example a machine table or a pallet).

An evaluation of the first image recording subsequently takes place (step 103).

If the material panel 9 is deposited on the machine table or the pallet, the position of the metal sheet can be detected by means of the geometrical dimensions of the material panel 9 (step 103A).

If the material panel 9 is to be deposited on the machine table or the pallet by using a lifting device, the optical measuring system may detect the position and orientation of the material panel 9 located on the lifting device in relation to the target position shortly before depositing (step 103B). Presupposing a purely vertical depositing movement is performed, with a not yet deposited material panel the actual position for the raised material panel can be deduced by projection of the spatially determined position onto the supporting plane. In the determination of the spatial position, markers or key feature points (key features) on the lifting device in combination with the optical detection of the orientation of the sheet can facilitate the ascertainment of an equation for transformation into the system of machine coordinates or system of pallet coordinates. Generally, according to embodiments of the present invention, allowance for tolerances may be made in the specification of target positions and/or in the detection of actual positions. Thus, tolerances of for example up to +/−50 mm in positioning are usual.

The evaluation allows a deviation of the determined actual panel position from the target position to be detected, for example with an image processing algorithm (step 105), and this to be used for the alignment and positioning of the material panel (step 107).

For example, the current position, a correction factor and/or the (optimum) target position may be displayed to an operator (step 107A). The representation of the information may also take place with the aid of augmented reality (AR), in that for example the current position, the correction factor and/or the target position are introduced into the live image of the data glasses (step 107B). As an alternative, display on a monitor, which may in particular also be in connection with the lifting device, is possible (step 107C). In addition, information about the current loading process, such as panel blank information, multi-panel loading and the depositing position, and also information about the then-following loading process may be displayed (step 107D).

For determining the deviation, the target position has to be provided (step 109). Generally, the target position may be manually predetermined (step 109A) or calculated in dependence on the configuration of supporting bars on laser flatbed machines at the loading time (step 109B). The target position may also be ascertained in dependence on a nesting of parts on the material panel, in particular in dependence on parameters such as the avoidance of tilting parts, optimum supporting of the parts during the cutting process, avoidance of slag spatter and avoidance of welding of parts to the underlying surface (step 109C).

The nesting of the parts to be produced may also be subsequently adapted, in particular optimized, in dependence on the loading position and the configuration of supporting bars (step 111). This may take place in dependence on parameters such as the avoidance of tilting parts, optimum supporting of the parts for example during the cutting process, avoidance of slag spatter and avoidance of welding of parts to the underlying surface.

When using a lifting device with a weight determining capability, the mass of the material panel can be detected (step 113). The mass of the material panel to be loaded may for example be measured by a balance of the lifting device or be calculated from the material-specific density and the geometrical dimensions of the material panel.

If the calculated weight and the actual weight of the material panel deviate from one another or from a target weight, an error can be inferred (for example incorrect raw material, a number of panels sticking together, etc.). The weight determining capability can thereby allow the avoidance of errors during loading.

The lifting device may be designed according to the initially cited DE 10 2017 223 574 A1. For the individual separation of parts from a residual cut-up sheet after the machining operation, the lifting device may also be equipped with passive suckers (in a modular manner), in order to assist the operator when lifting out heavy parts (for example <20 kg).

In addition or as an alternative to the previously described steps, fully or partially automated depositing of the material panel may be performed on the basis of the evaluation of the first image recording (step 103) and the detection of the deviation (step 105). For this purpose, the operator may for example select an "automatic mode" for placing/depositing the material panel after the manually controlled gripping (step 115). The (partly) automatic mode may also comprise activation of the crane (of the lifting device) by radio and/or by the optical measuring system (the control unit). In addition, safety monitoring with a space scanner may be provided.

FIGS. 4A and 4B show schematic representations of the supporting area, as it can be displayed for example on the monitor 21 or introduced into the data glasses 23.

The representation of FIG. 4A comprises image recordings 22 of the simplified content of a pallet, as it is shown for example in FIG. 1. A rectangular frame 13, which delimits the pallet 7, and also the supporting bars 13A, which are arranged uniformly in the frame 13, can be seen. The image recording 22 also shows a surface 51 (hatched) of a material panel and also its outer contour 53 (dashed) in a rectangular form, which correspond to an actual position 55 of the material panel. Also indicated are contours 19 of workpieces to be cut, as they are to be cut out from the material panel with a cutting plan aligned with a fixed target position 57 (dash-dotted). The actual panel position 55 and the target position 57 are for example in each case given by a distance in the supporting plane between a reference point of the material panel 9 (for example a center of gravity or centroid) and a reference point 0 of the supporting plane (of the pallet) and an alignment of the material panel 9 in the supporting plane.

It can be seen that the current actual position, as it has been captured by the image recording 22, would not ensure the overlap of the contour 19A with the thus-positioned material panel. The image processing algorithm detects this and causes the display of displacement arrows 59.

On the basis of this display, the operator can manually correct the position and alignment of the material panel or cause a corresponding automated correction to be performed. A person skilled in the art will recognize that the procedure for increasing the accuracy can in particular be carried out iteratively with subsequent (second, third, etc.) image recordings.

For the sake of completeness, a reference point 0 of a system of pallet coordinates is depicted on the image recording 22, which establishes the relationship of the pallet to the system of machine coordinates.

FIG. 4B illustrates that an adaptation of the machining plan can also be induced on the basis of the image recording produced. For example, when checking the nesting of the workpieces, it can be detected that, when the target position 22 is adopted, an exchange of workpiece positions induced by an exchange arrow 61 would lead to higher machining quality.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for loading a panel depositing device of a flatbed machine tool, the method comprising:
    acquiring, using a camera system that is spatially calibrated in relation to a system of machine coordinates of the flatbed machine tool, an image recording of a material panel in the area of the panel depositing device, the image recording including image of supporting bars of the panel depositing device,
    evaluating the image recording for determining an actual panel position of the material panel in the system of machine coordinates, and for detecting an arrangement of the supporting bars,
    determining a target panel position based on the arrangement of the supporting bars and a nesting of workpieces to be produced from the material panel, detecting a deviation of the actual panel position from a target panel position, and using the detected deviation for aligning and positioning of the material panel.

2. The method as claimed in claim 1, wherein the actual panel position is determined in a supporting plane of the panel depositing device and wherein the actual panel position is given by a distance in the supporting plane between a reference point of the material panel and a reference point of the supporting plane, and the target position is given by an alignment of the material panel in the supporting plane.

3. The method as claimed in claim 1, further comprising:

depositing the material panel on the panel depositing device, so that the actual panel position for the deposited material panel is determined.

4. The method as claimed in claim 3, wherein a lifting device for depositing the material panel on the panel depositing device is provided, the method further comprising:

picking up the material panel with the lifting device and transporting the material panel with the lifting device over the panel depositing device, so that the actual panel position for the material panel held above the panel depositing device is determined.

5. The method as claimed in claim 4, wherein the actual panel position in the supporting plane of the panel depositing device is determined on an assumption of a purely lowering movement of the material panel onto the panel depositing device.

6. The method as claimed in claim 4, wherein an equation for transformation of a spatially determined position of the material panel into the system of machine coordinates is obtained with the aid of at least one marker or at least one key feature which is provided on the lifting device, in order to determine the actual panel position in the supporting plane.

7. The method as claimed in claim 4, wherein the lifting device comprises a weighing unit for determining a mass of the material panel picked up, wherein the weighing unit is a balance or a computing unit which deduces the mass from the first image recording of the material panel and a material-specific density of the material panel, and the method further comprises the steps of:

determining the mass of the material panel picked up, comparing the determined mass with a predetermined mass of the material panel intended for machining, and outputting an error signal upon determining a deviation of the determined mass from the predetermined mass based on the comparison.

8. The method as claimed in claim 1, further comprising deducing geometrical dimensions of the material panel from the image recording by using the spatial calibration of the camera and determining the actual panel position on the basis of the geometrical dimensions of the material panel.

9. The method as claimed in claim 1, wherein the detected deviation is used to activate the lifting device in such a way that the material panel is deposited at the target position.

10. The method as claimed in claim 3, wherein the material panel is automatically deposited.

11. The method as claimed in claim 1, further comprising displaying information about the deviation and/or the target position and/or the actual panel position to an operator of the flatbed machine tool, on a monitor of the flatbed machine tool or on an augmented reality display unit.

12. The method as claimed in claim 1, further comprising adapting a machining process and/or the target position based on the actual panel position.

13. The method as claimed in claim 1, wherein the target position is determined based on at least one of parameters for avoidance of tilting of workpieces, supporting of the workpieces during a cutting process, avoidance of slag spatter on the workpieces, or welding of the workpieces.

14. A flatbed machine tool, comprising:

a panel depositing device designed as a pallet changer with a pallet, for providing a depositing surface for bearing a material panel, a camera system with at least one camera, which is designed for producing an image recording of the panel depositing device which is spatially calibrated with respect to a system of machine coordinates of the flatbed machine tool, wherein the image recording shows a pallet with the material panel resting on it or at a vertical distance, a machining unit, which is designed as a laser cutting unit, and a control unit for carrying out a method as claimed in claim 1.

15. The flatbed machine tool as claimed in claim 14, further comprising a lifting device.

16. The flatbed machine tool as claimed in claim 14, wherein the at least one camera is attached to the machining unit and/or the camera system is designed for two-dimensional and/or three-dimensional image capture.

* * * * *